United States Patent [19]

Nagatsuka et al.

[11] Patent Number: 5,497,278
[45] Date of Patent: Mar. 5, 1996

[54] CASSETTE MOUNTING DEVICE HAVING CASSETTE REMOVAL FACILITY ADDITIONAL TO CUSTOMARY INSERTION/EJECTION APERTURE PART

[75] Inventors: Osamu Nagatsuka; Kiyoshi Kumagai, both of Kanagawa,, Japan

[73] Assignee: Canon Kabushiki Kaisha, Tokyo, Japan

[21] Appl. No.: 282,052

[22] Filed: Jul. 28, 1994

[51] Int. Cl.⁶ .................................................. G11B 5/027
[52] U.S. Cl. .......................................... 360/85; 360/96.5
[58] Field of Search ........................ 360/96.5, 85, 98.04, 360/98.06; 369/191, 194, 202

[56] References Cited

U.S. PATENT DOCUMENTS 4,580,183  4/1986  Maeda ........................................ 360/85
4,635,147  1/1987  Durand ..................................... 360/96.5
4,965,683  10/1990  Otani ....................................... 360/96.5

Primary Examiner—A. J. Heinz
Attorney, Agent, or Firm—Robin, Blecker, Daley and Driscoll

[57] ABSTRACT

In a cassette mounting device arranged to cause a cassette which contains a tape-shaped recording medium therein to move between its mounting position and a position in which information is recorded or reproduced on or from the recording medium, a holder for holding the cassette is provided with a hatch part and an aperture part which is arranged to be formed by removing the hatch part from the holder, the aperture part being arranged such that the cassette can be taken out, if necessary, from the holder through the aperture part without damaging the recording medium.

13 Claims, 14 Drawing Sheets

FIG.2(a) (PRIOR ART)
FIG.2(b) (PRIOR ART)
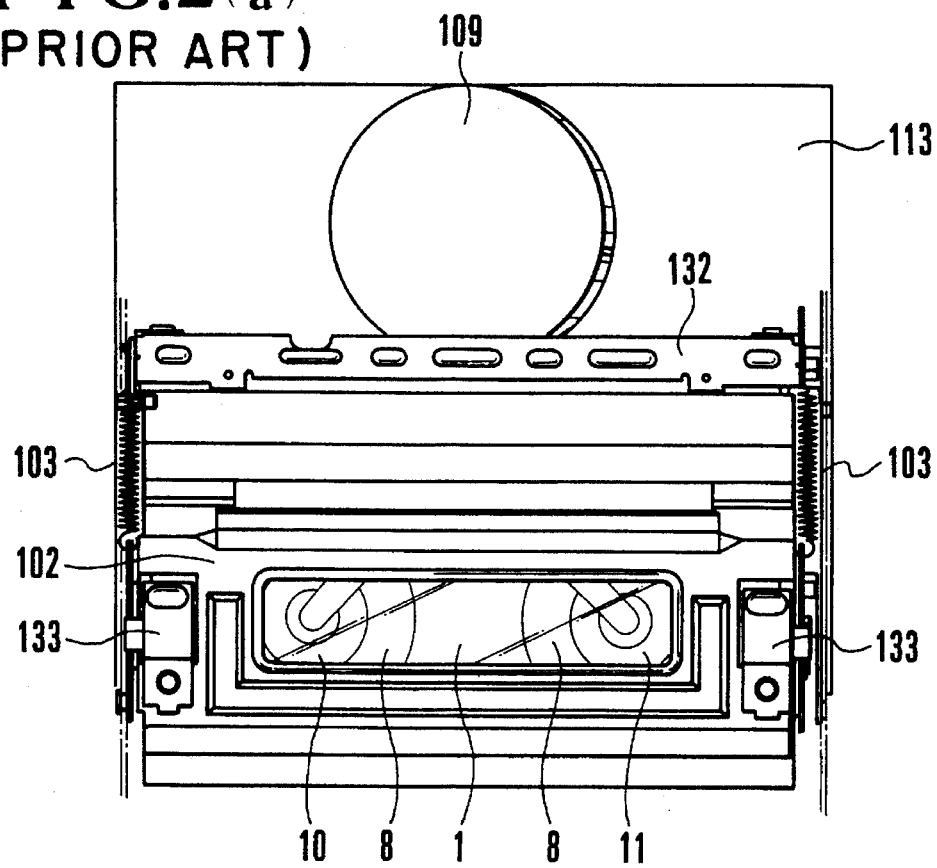
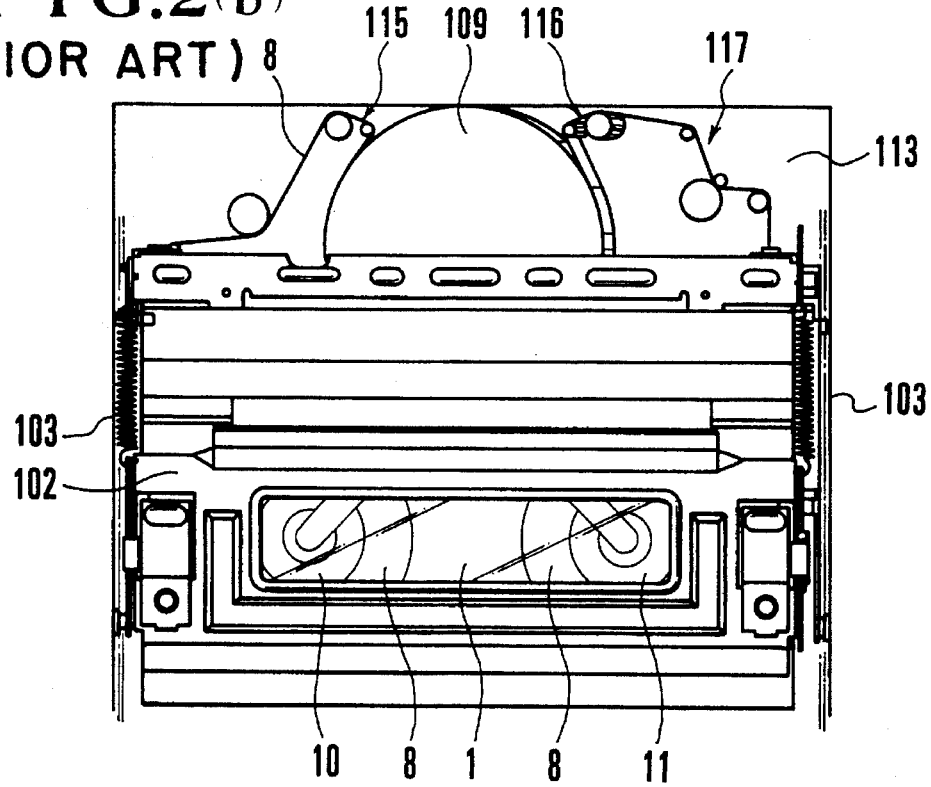

CASSETTE MOUNTING DEVICE HAVING CASSETTE REMOVAL FACILITY ADDITIONAL TO CUSTOMARY INSERTION/EJECTION APERTURE PART

BACKGROUND OF THE INVENTION

1. Field of the Invention

This invention relates to a cassette mounting device arranged to move a cassette between a cassette mounting position and a position where information is to be recorded on or reproduced from a tape-shaped recording medium which is contained in the cassette.

2. Description of the Related Art

The cassette mounting device employed in a recording and/or reproducing apparatus of the kind using an 8 mm video cassette or the like has been arranged in general as described below with reference to FIGS. 1(a) to 1(c) through FIGS. 5(a) and 5(b) of the accompanying drawings:

FIGS. 1(a), 1(b) and 1(c) and FIGS. 2(a) and 2(b) show the conventional cassette mounting device in side views and plan views, respectively. Referring to these figures, a cassette 1 has reels 10 and 11 contained therein. A holder 102 which is generally made of aluminum is arranged to hold the cassette 1. A link 103 is arranged between each of two opposite sides of the holder 102 and a reel chassis 112 which is mounted on a main chassis 113 to interconnect them in such a way as to allow the holder 102 to be moved toward or away from the reel chassis 112.

As shown in FIG. 1(a), the cassette 1 is inserted in the direction of arrow A. After the cassette 1 is inserted, the holder 102 is pushed down toward the reel chassis 112 against a spring force of a spring 105. An opening member 114 which is mounted on the holder 102 then acts to open a lid provided on the cassette 1. The holder 102 is then locked to the reel chassis 112 by lock means which is not shown. The cassette 1 is then held in a predetermined position on the reel chassis 112 as shown in FIG. 1(b). Further, as shown in FIG. 1(c), the reel chassis 112 horizontally moves with respect to the main chassis 113. Under this condition, a tape-shaped recording medium 8 (hereinafter referred to as the tape) is pulled out from the reel 10 and wrapped around a drum 109 through loading members 115, 116 and 117 as shown in FIG. 2(b). With the tape 8 thus wrapped around the drum 109, information is recorded or reproduced on or from the tape 8.

In taking out the cassette 1, the above-stated actions are performed in reverse sequence. A tape unloading action is carried out at the same time when the reel chassis 112 is slid out. With the tape 8 unloaded, the reel 10 or 11 winds up and pulls the tape 8 to the inside of the cassette 1. Upon completion of the sliding out movement of the reel chassis 112, the lock means unlocks to allow the holder 102 to be moved upward by the force of the spring 105. The lid of the cassette 1 is closed concurrently with the upward movement of the holder 102 and then the cassette 1 can be taken out from the holder 102.

Referring to FIG. 2(a), a reinforcing member 132 is attached to the end part of the holder 102 to reinforce the rigidity of the latter. In this case, urging members 133 which are arranged to push the cassette 1 against the reel chassis 112 are secured directly to the right and left ends of the upper face of the holder 102 by caulking.

According to the arrangement of the conventional cassette mounting device described above, however, a reel system tends to malfunction at the time of unloading. In addition to that, the reels 10 and 11 might come to a stop due to a trouble while recording or reproduction is still in process to necessitate the cassette 1 to be taken out before the tape 8 has not been completely taken up into the cassette 1 as shown in FIG. 3. However, in such a case, as shown in FIG. 4, a projection 107 which is provided in the cassette mounting device of this kind for preventing the cassette 1 from being erroneously inserted and also for unlocking the lid 1a and a turning member 1b which is provided on the cassette 1 in a state of abutting on the holder 102 prevent the cassette 1 from being taken out with the lid 1a left in an open state. The cassette 1 then may be taken out by unlocking the lock means as the lid 1a of the cassette 1 closes when the holder 102 moves upward. In that case, however, the tape 8 in trouble would be damaged by being caught by the lid 1a. The conventional cassette mounting device thus has presented the problem that, in the event of occurrence of a trouble which causes the tape 8 to be not completely taken up into the cassette 1, it is hardly possible to take out the cassette 1 without damaging the tape 8 on which information is recorded.

Further, as shown in detail in FIGS. 5(a) and 5(b) which show the holder 102 alone, the urging members 133 are secured by caulking to the holder 102 which is generally made of a material of a relatively low strength such as aluminum. It is not easy to adequately carry out the caulking work on the urging members 133 in securing them to the holder 102 which is in a box-like shape and is allowed to occupy only a narrow space. The workability of the device for assembly work is thus poor. The holder 102, therefore, tends to be deformed by caulking while the urging members 133 must be disposed precisely at a predetermined distance from a predetermined face of the holder 102. Therefore, it has been not easy to precisely position the urging members 133.

SUMMARY OF THE INVENTION

This invention is directed to the solution of the problems of the conventional cassette mounting device described in the foregoing. It is a first object of this invention to provide a cassette mounting device which is arranged such that, in the event of occurrence of a trouble preventing the tape from being completely taken up into its cassette, the cassette can be taken out without damaging the tape on which information has been recorded.

It is a second object of this invention to provide a cassette mounting device which is arranged to permit each of the urging members of a cassette holder to be set precisely at a predetermined distance from a predetermined face of the holder at the time of assembly work, to improve the workability and reliability of the assembly work and to reduce the manufacturing cost.

To attain the first object, a cassette mounting device arranged as a first embodiment of this invention comprises (a) a holder capable of moving, while holding a cassette in which a recording medium is contained, between a first position where the cassette can be inserted and ejected and a second position where information can be recorded or reproduced on or from the recording medium, the holder including a first member having a first aperture part where the cassette can be inserted and ejected in the first position and a second aperture part provided in a part different from the first aperture part where the cassette inserted in the holder can be taken out and a second member removably secured to the first member and arranged to cover the second aperture part, and (b) a moving mechanism arranged to move the holder between the first position and the second position.

To attain the second object, a cassette mounting device arranged as a second embodiment of this invention is arranged, in addition to the arrangement of the first embodiment, such that the holder includes a pressing member mounted on the second member to push the cassette inserted into the holder.

These and other objects and features of this invention will become apparent from the following detailed description of embodiments thereof taken in conjunction with the accompanying drawings.

BRIEF DESCRIPTION OF THE DRAWINGS

FIGS. 2(a) and 2(b) are plan views showing the arrangement and operation of the conventional cassette mounting device.

DETAILED DESCRIPTION OF THE PREFERRED EMBODIMENT

A preferred embodiment of the invention is described in detail below with reference to the drawings.

Figure 1A:
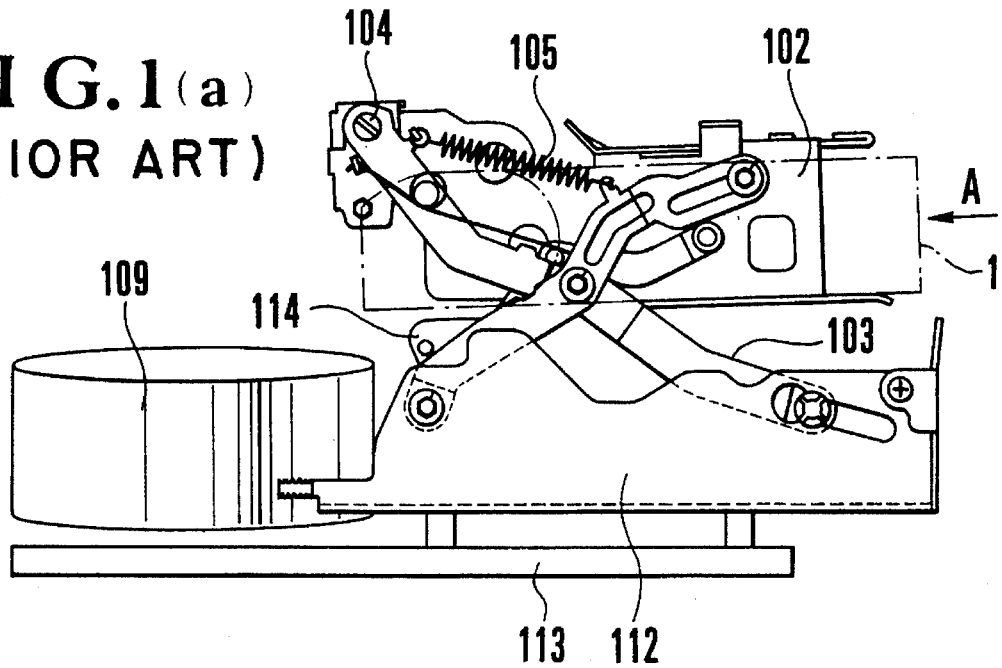
FIGS. 1(a) to 1(c) are side views showing the arrangement and operation of the conventional cassette mounting device.
Figure 1B:
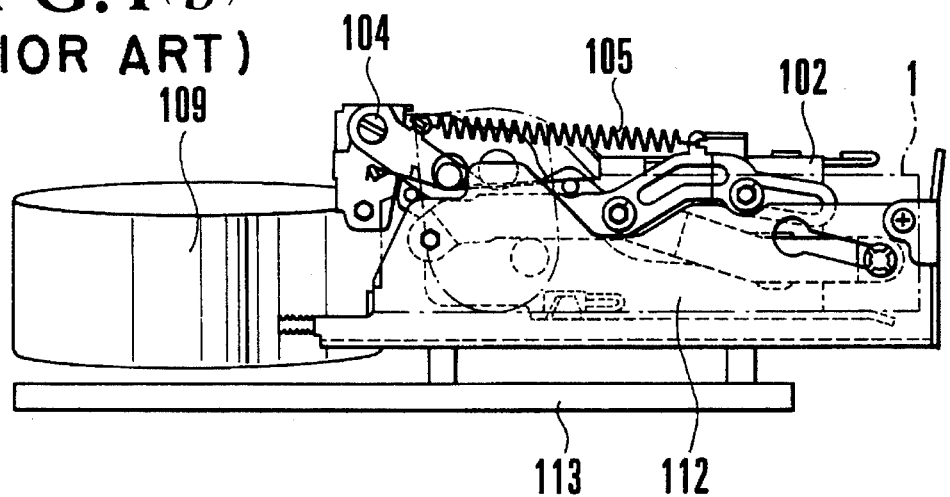
Figure 1C:
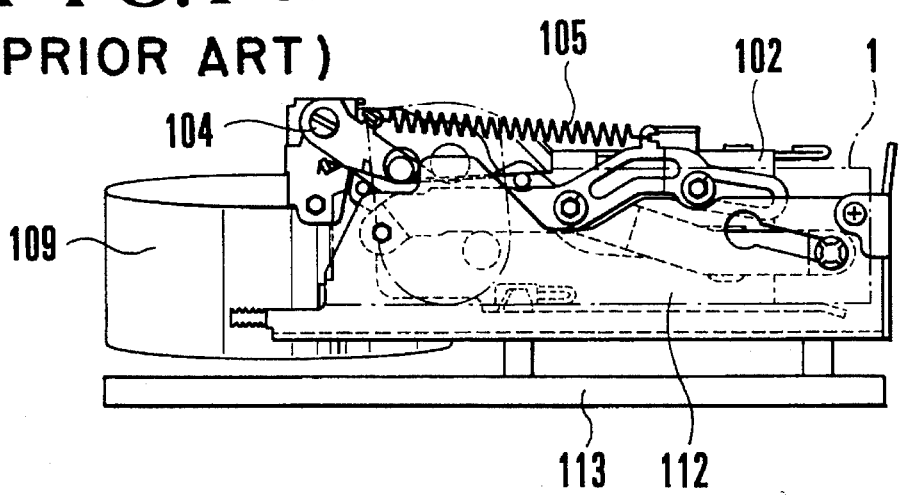
Figure 3:
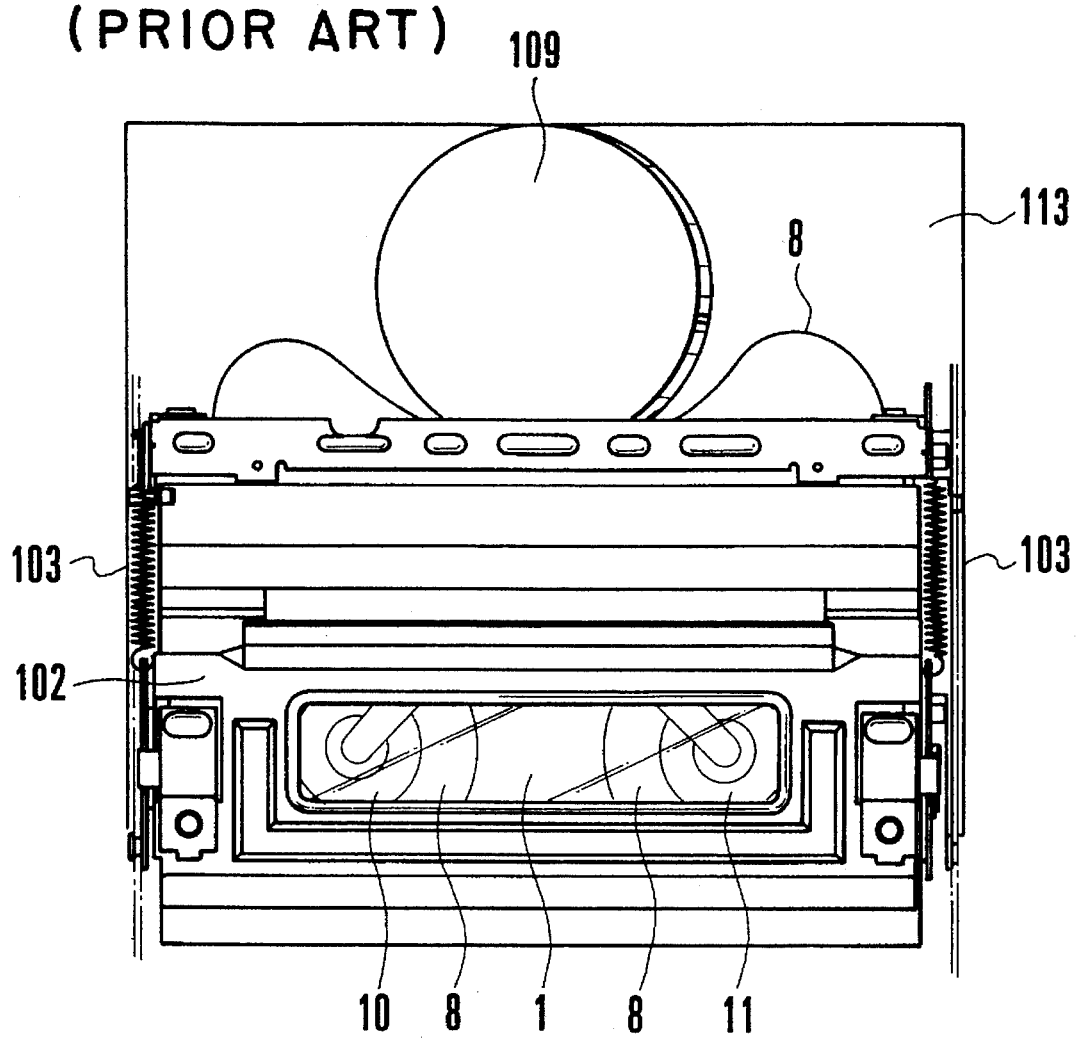
FIG. 3 is a plan view showing the conventional cassette mounting device in a state of being in trouble.
Figure 4:
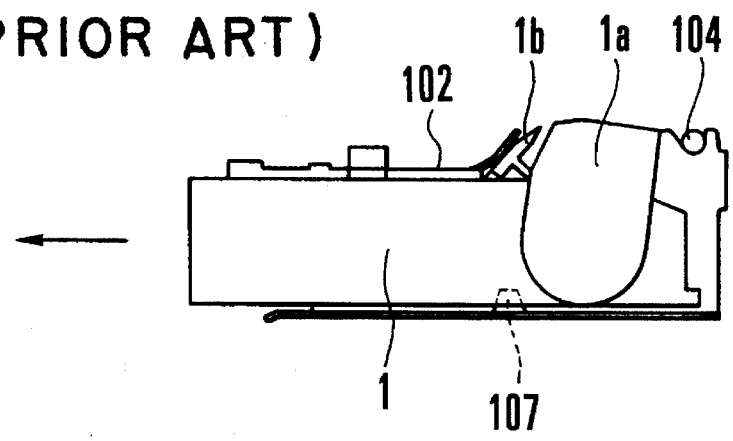
FIG. 4 is a sectional view taken along a line B—B of FIG. 2(a).
Figure 5A:
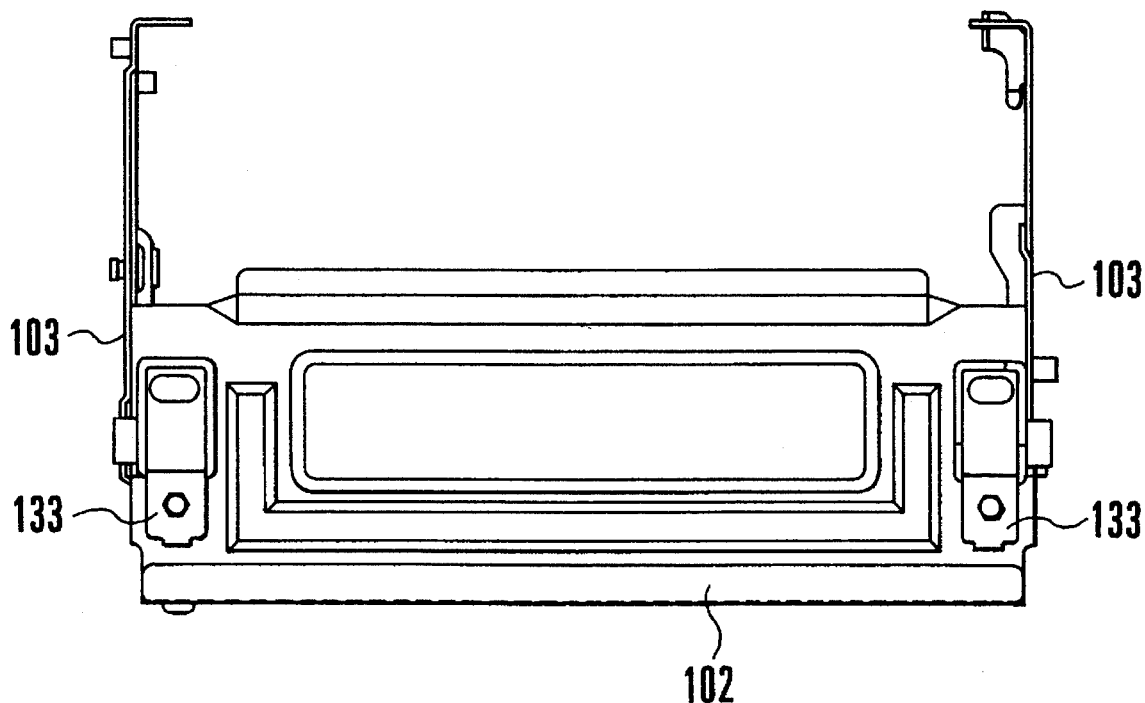
FIG. 5(a) is a plan view showing a holder unit included in the conventional cassette mounting device.
Figure 5B:
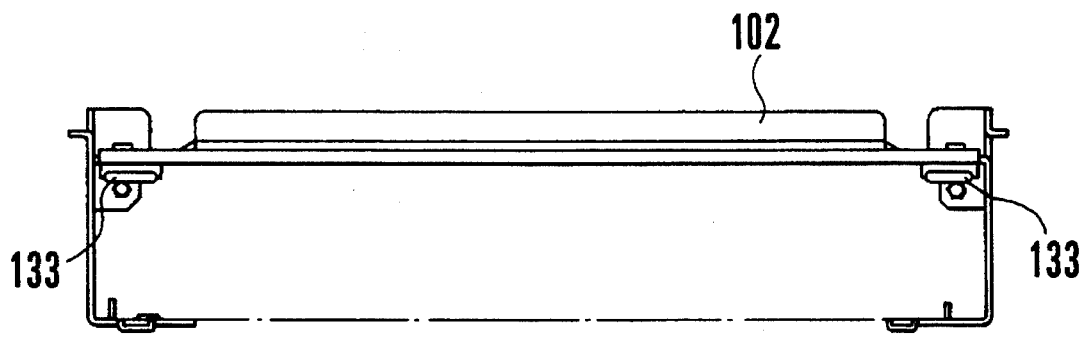
FIG. 5(b) is a front view of FIG. 5(a).
Figure 6A:
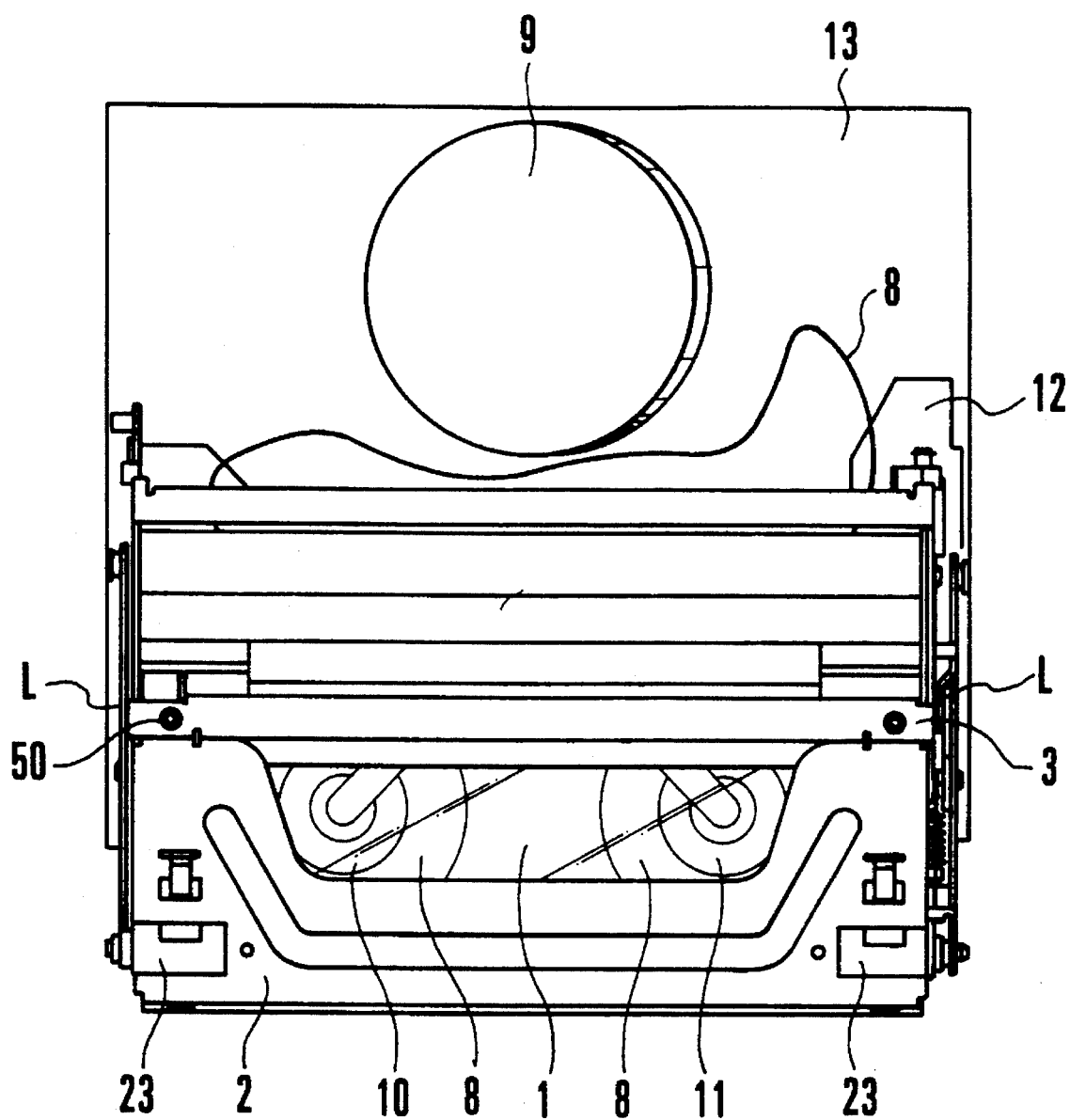
FIG. 6(a) is a plan view showing the arrangement of an embodiment of this invention.
Figure 6B:
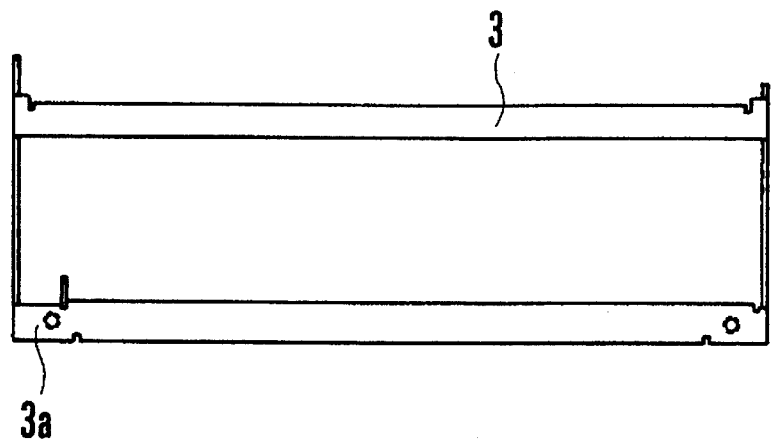
FIG. 6(b) shows the arrangement of a holder hatch included in the embodiment shown in FIG. 6(a)
Figure 6C:
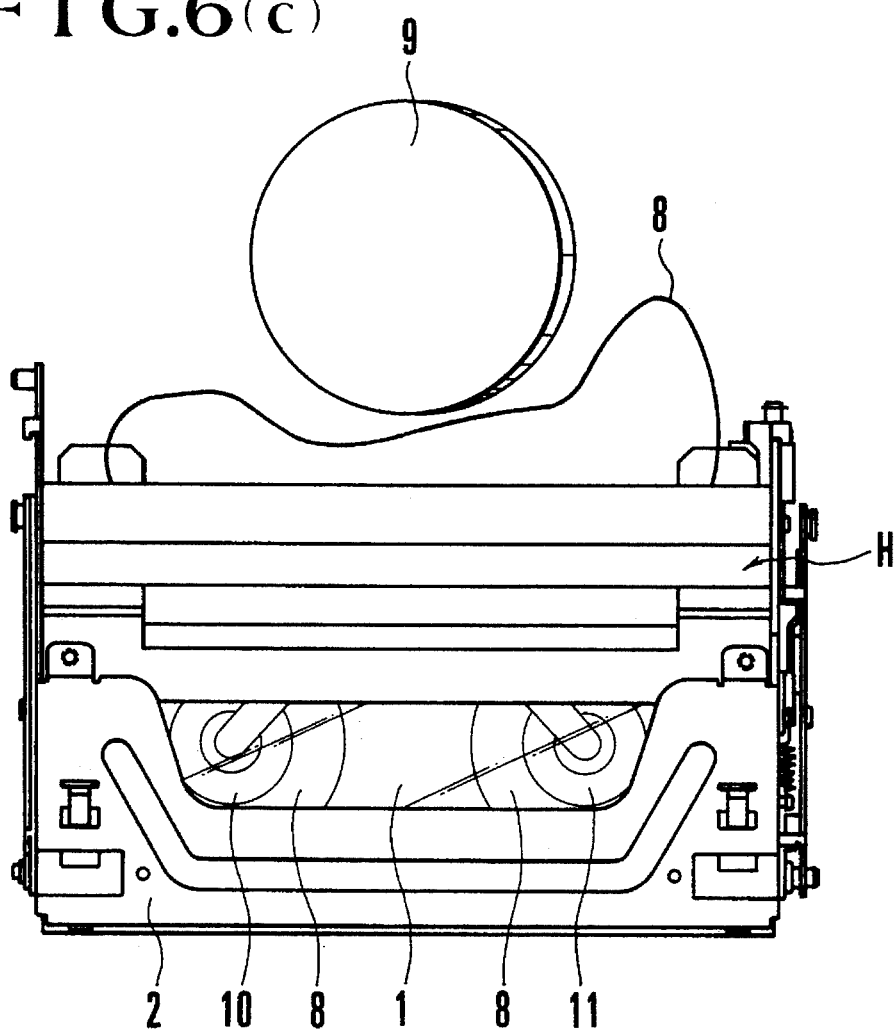
FIG. 6(c) is a plan view showing the arrangement of the same embodiment in a cassette mounting position.
Figure 7A:
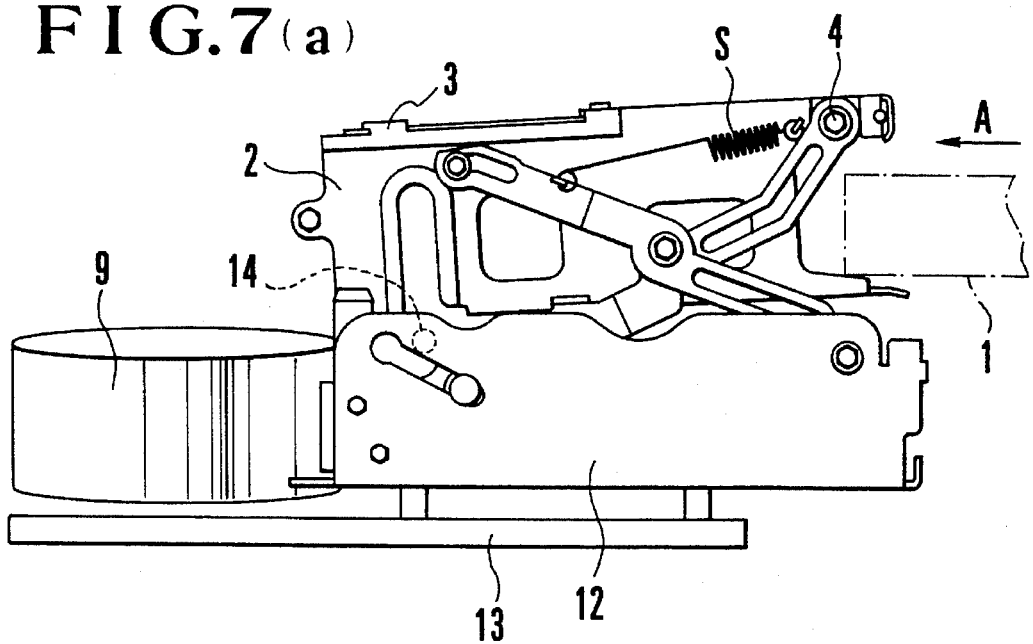
FIGS. 7(a) to 7(c) are side views showing the embodiment of the invention in a state of performing a cassette mounting action.
Figure 7B:
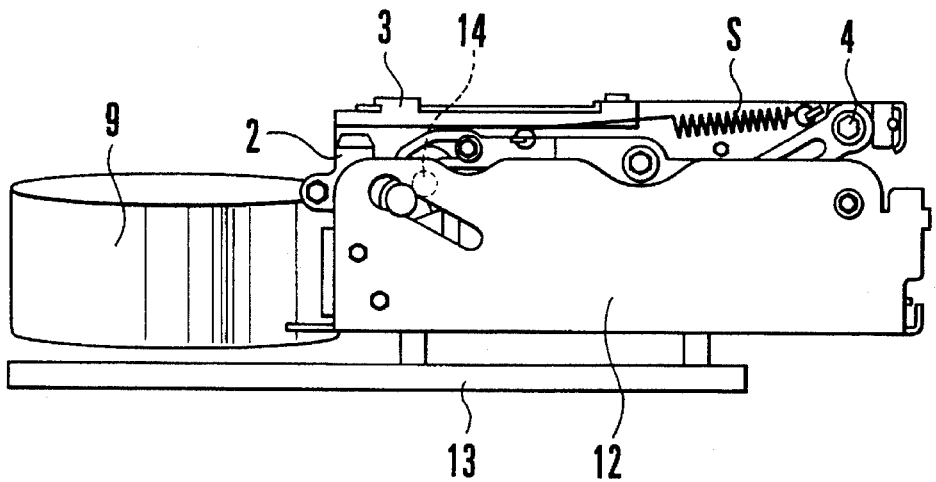
Figure 7C:
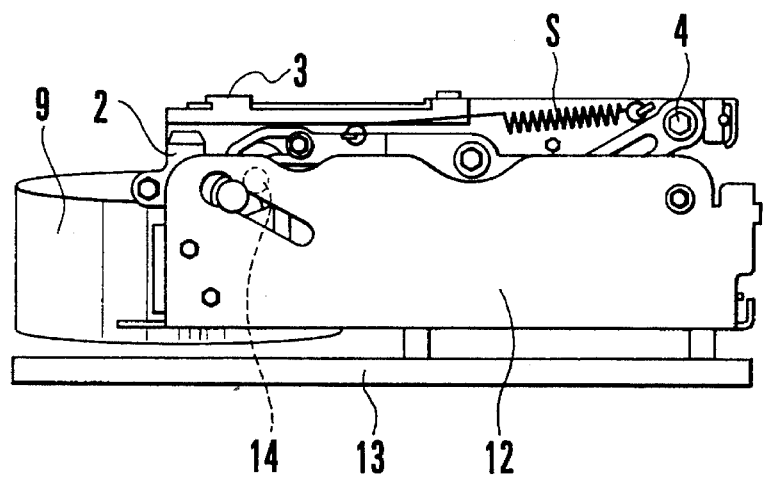

A cassette mounting device which is arranged according to the invention as one embodiment thereof is first described with reference to FIGS. 6(a) to 6(c) through FIGS. 8(a) to 8(d). FIGS. 6(a) to 6(c) show the arrangement of the embodiment. FIG. 6(a) is a plan view of the cassette mounting device. FIG. 6(b) shows a holder hatch in a state of having been removed from a holder. FIG. 6(c) is a plan view showing the cassette mounting device in a cassette mounting position. FIGS. 7(a) to 7(c) are side views of the cassette mounting device, showing it in process of mounting a cassette. FIGS. 8(a) to 8(d) are sectional views showing the device in a state of taking an action.

As shown in FIG. 6(a), a holder hatch 3 acting as a movable holder is mounted with screws 50 on a part of a holder 2 which is arranged to hold a (tape) cassette 1. When the holder hatch 3 is removed from the holder 2 as shown in FIG. 6(b), an aperture part H which is formed in the holder 2 opens as shown in FIG. 6(c) to allow the cassette 1 to be taken out from the holder 2. The holder hatch 3 is provided with holes 3a for securing it to the holder 2 with the screws 50. The hatch 3 serves also as a reinforcing member for increasing the rigidity of the holder 2.

In a normal state, the cassette 1 is inserted from a direction of arrow A into the holder 2 as shown in FIG. 7(a). After the cassette 1 is inserted, the holder 2 is pushed down toward a reel chassis 12 against a spring force of a spring S. An opening member 14 which is mounted on the reel chassis 12 then acts to open a lid provided on the cassette 1. The holder 2 is then locked to the reel chassis 12 by lock means which is not shown. The cassette 1 is held on the reel chassis 12, as shown in FIG. 7(b), in a predetermined position where the reels 10 and 11 of the cassette 1 engage reel bases which are not shown. The reel chassis 12 then horizontally moves with respect to a main chassis 13 as shown in FIG. 7(c). Under this condition, a tape 8 is pulled out from the reel 10 and is wrapped, by a loading system (not shown), around a rotary drum 9 on which a head (not shown).is mounted. With the tape 8 thus loaded, information is recorded or reproduced on or from the tape 8.

Figure 8A:
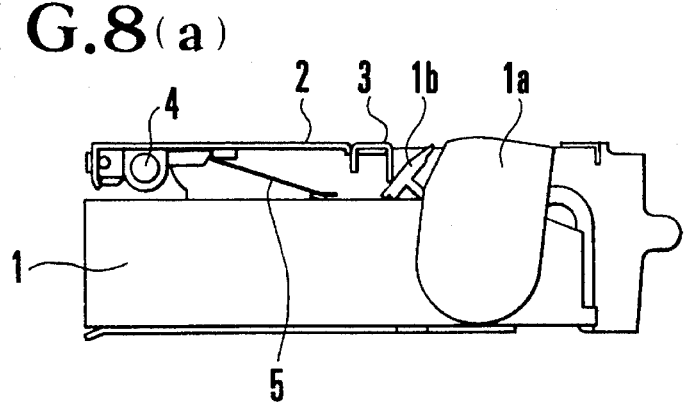
FIGS. 8(a) to 8(d) are sectional views showing the operation of the embodiment of this invention.
Figure 8B:
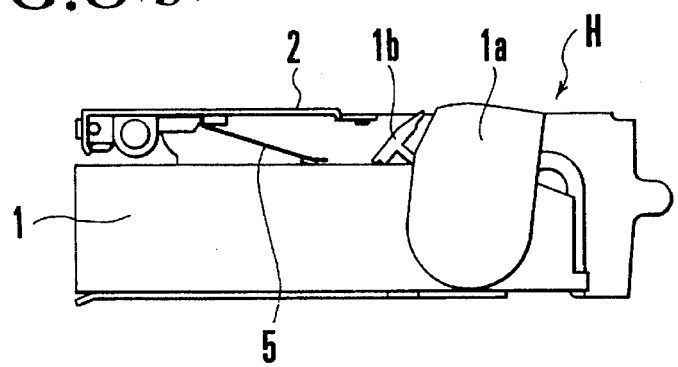
Figure 8C:
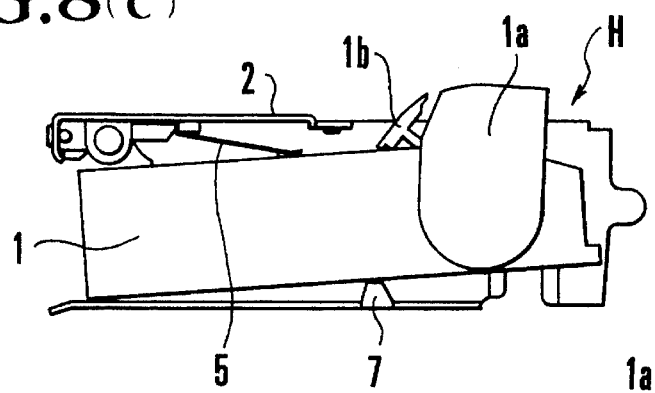
Figure 8D:
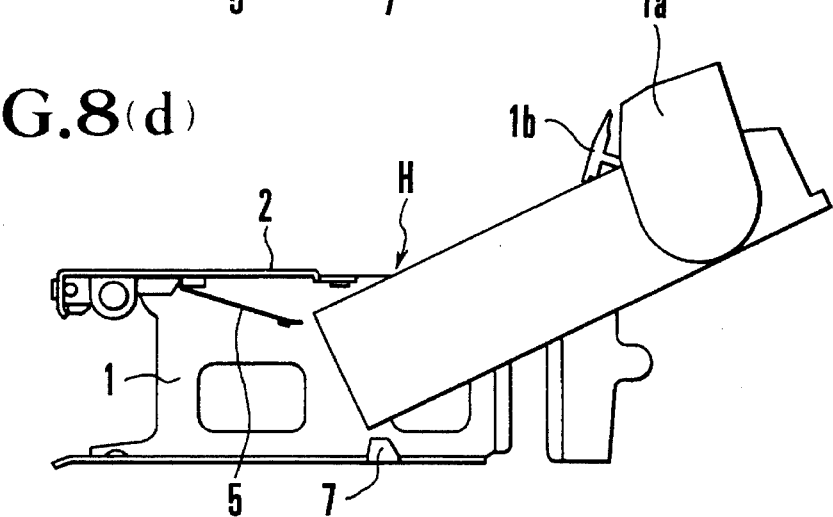

In FIG. 6(a), the cassette mounting device is shown in a troubled state, in which the tape 8 is left in a loaded state between the reels 10 and 11, with either the reel system coming out of order in unloading or the reels 10 and 11 accidentally coming to a stop while a recording operation or a reproducing operation is still in process. In the event of such a trouble, the holder hatch 3 which is in a shape as shown in FIG. 6(b) and is secured to the holder 2 with the screws 50 as shown in FIG. 6(a) is removed from the holder 2 by loosening the screws 50. With the holder hatch 3 thus removed, the aperture part H is formed in the holder 2 as shown in FIG. 6(c) to permit the cassette 1 to be taken out, in the same loading state, away from the side of the drum 9. Referring to FIGS. 8(a) to 8(d) which are sectional views taken on a line B—B of FIG. 6(a), when the holder hatch 3 is removed from the state of FIG. 6(a), a rotary member 1b of the cassette 1 disengages from the holder hatch 3 and the aperture part H is formed to allow the cassette 1 to be taken out on the side of the drum 9. Then, the lid 1a of the cassette 1 is prevented from closing. After that, the holder 2 is unlocked to allow the holder 2 to move upward. With the lid 1a thus kept in an open state, the cassette 1 is easily disengaged from a projection 7 which is provided for unlocking the lid 1a. Then, as shown in FIGS. 8(b) to 8(d), the cassette 1 can be taken out away from the side of the drum 9 with the wrapped shape of the tape 8 left intact.

With the embodiment arranged in the manner as described above, the cassette 1 can be easily taken out without damaging the tape 8 when the tape 8 cannot be wound up on the reel 10 or 11 due to a trouble occurring in the reel system in unloading or due to a trouble occurring while recording or reproduction is in process. In the event of such a trouble, therefore, the cassette mounting device can be readily repaired.

In the case of the embodiment described, the cassette mounting part is arranged to be mounted on a movable reel chassis. However, this arrangement may be changed to have the reel system, the drum system, etc., all mounted on the main chassis. Further, in the embodiment described, the movable holder part is arranged to be the holder hatch which is removably mounted by means of the screws. However, that arrangement also may be changed to arrange a movable holder to be slidable over the holder in such a way as to give an aperture part by sliding the movable holder.

Figure 9A:
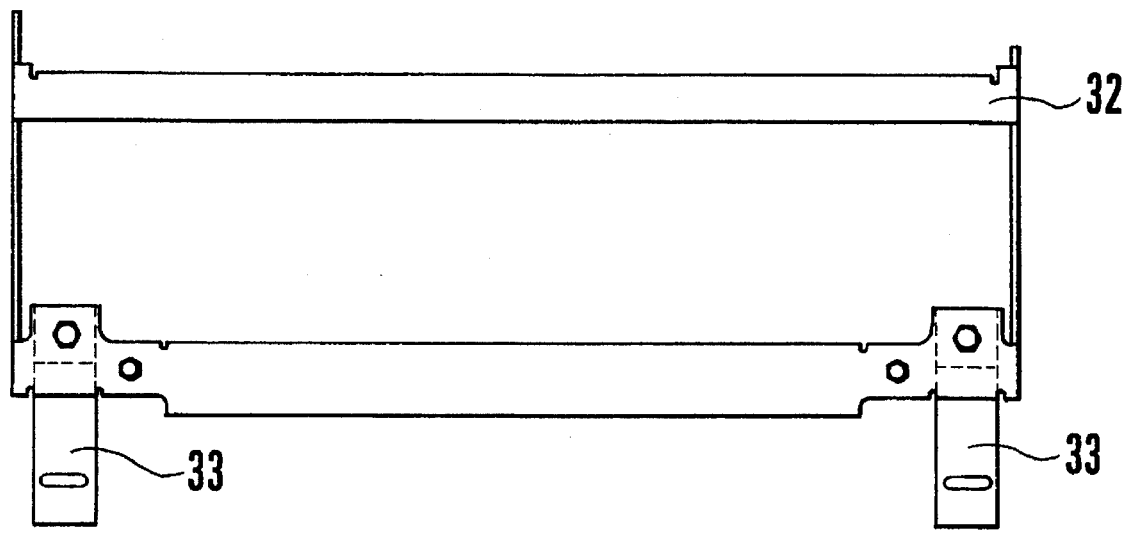
FIGS. 9(a) and 9(b) are plan views showing another example of the arrangement of the holder hatch.
Figure 9B:
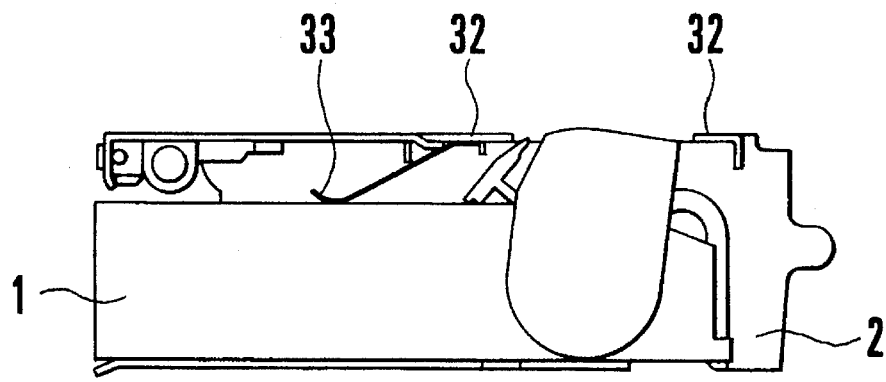

The following describes by way of example a holder hatch which is arranged differently from the holder hatch of the embodiment described in the foregoing. FIG. 9(a) shows the shape of the holder hatch 32. A pair of urging members 33 which are arranged to push the cassette 1 against the chassis are caulked directly to the holder hatch 32 at two opposite ends on one side of the holder hatch 32. The holder hatch 32 and the urging members 33 are disposed in positions as shown in FIG. 9(b) when they are mounted on the holder 2.

Since the urging member 33 is secured directly by caulking to the holder hatch 32 which is made of a rigid material, the caulking work can be done more easily than the caulking work on the holder 2. Therefore, the holder 2 is never deformed by caulking, and the urging members 33 can be accurately positioned. The arrangement thus enhances productivity and permits reduction in cost of manufacture of the whole cassette mounting device which has a high grade of performance.

Figure 10:
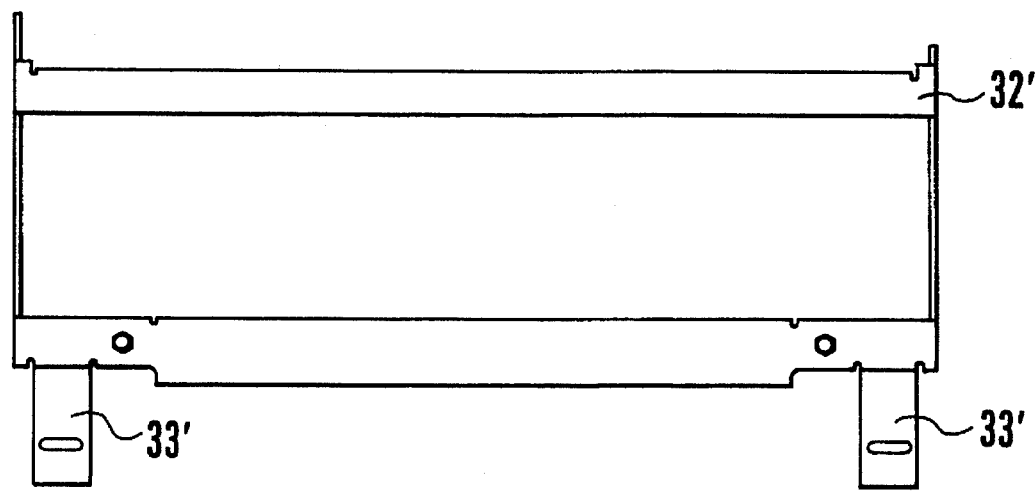
FIG. 10 is a plan view showing a further example of the arrangement of the holder hatch.

FIG. 10 shows another example of modification of the holder hatch. In the case of this modification, the holder hatch 32' is made of a spring material and has parts of it formed into urging members 33'. The modification obviates the necessity of the caulking work to permit further reduction in cost of manufacture of the whole cassette mounting device.

According to the arrangement of the modification examples given above, the holder 2 is never deformed by the mounting work on the urging members 33 or 33'. The urging members 33 or 33' can be mounted without any deviation from their predetermined positions. Therefore, a cassette mounting device in which each of the urging members is set precisely at a predetermined distance from a predetermined face of the holder can be obtained at a low manufacturing cost.

Figure 11A:
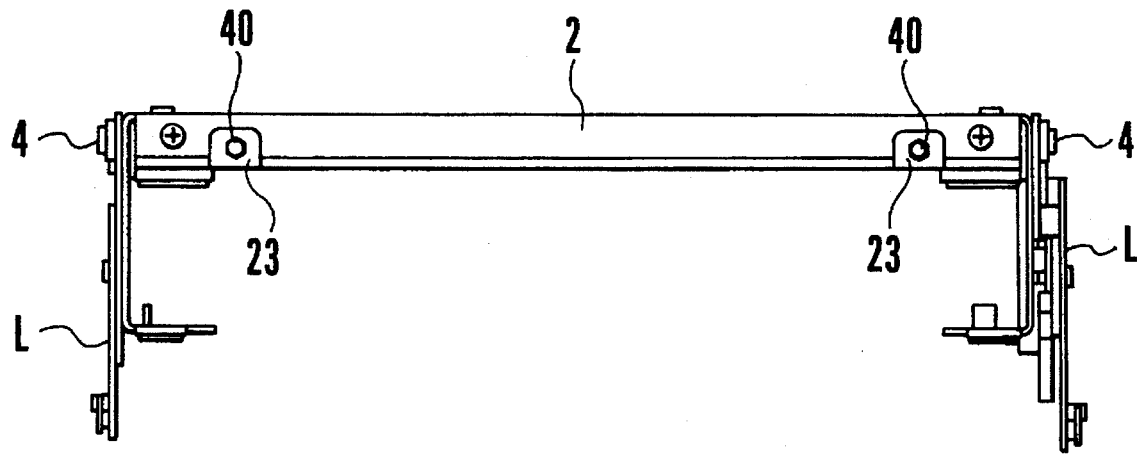
FIG. 11(a) is a front view showing the arrangement of the holder of the embodiment.
Figure 11B:
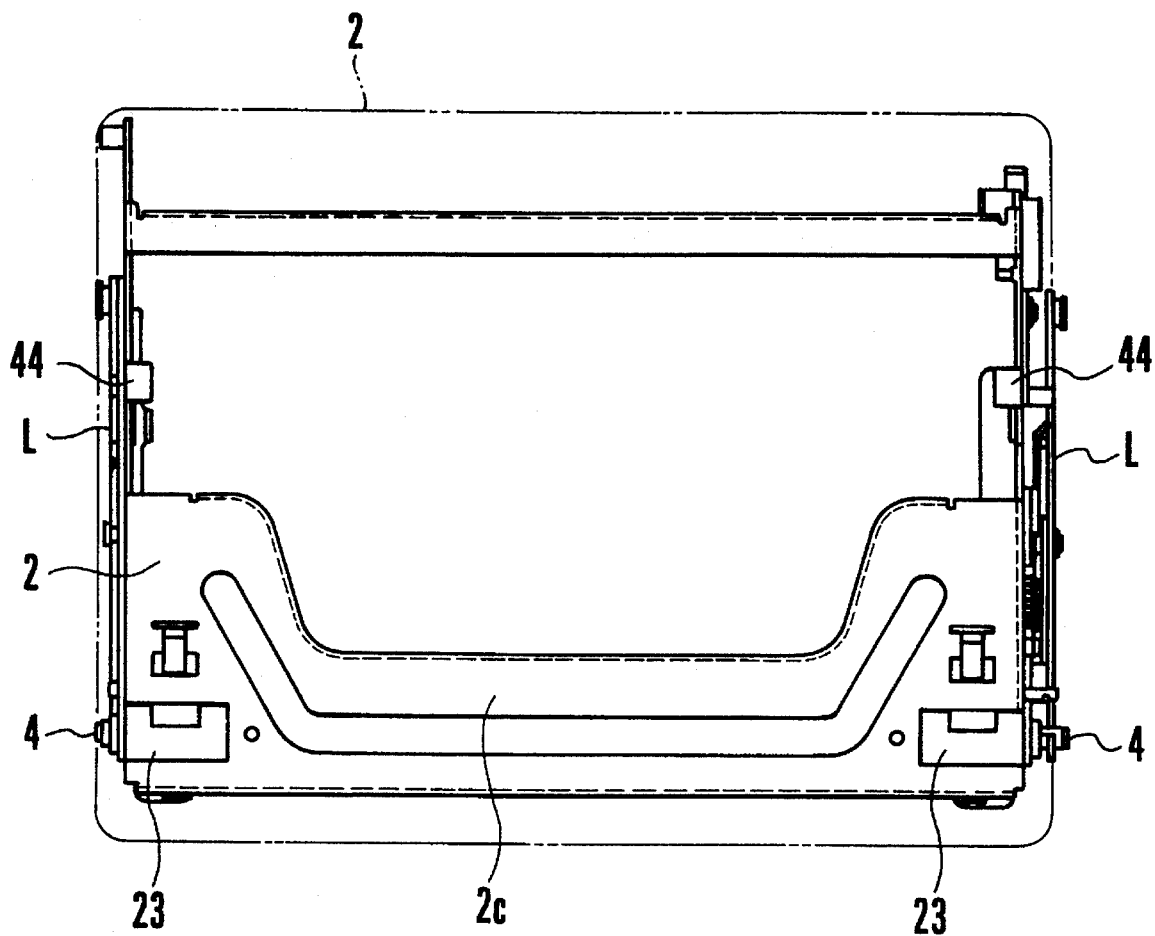
FIG. 11(b) is a plan view of the same holder.
Figure 11C:
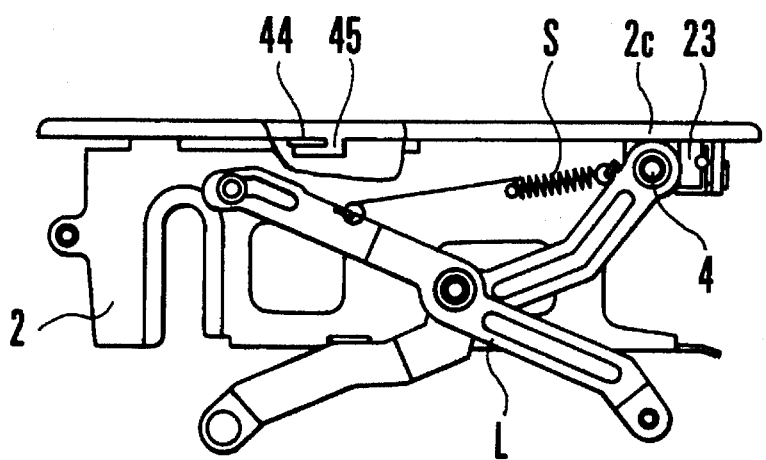
FIG. 11(c) is a side view of the same holder.
Figure 12:
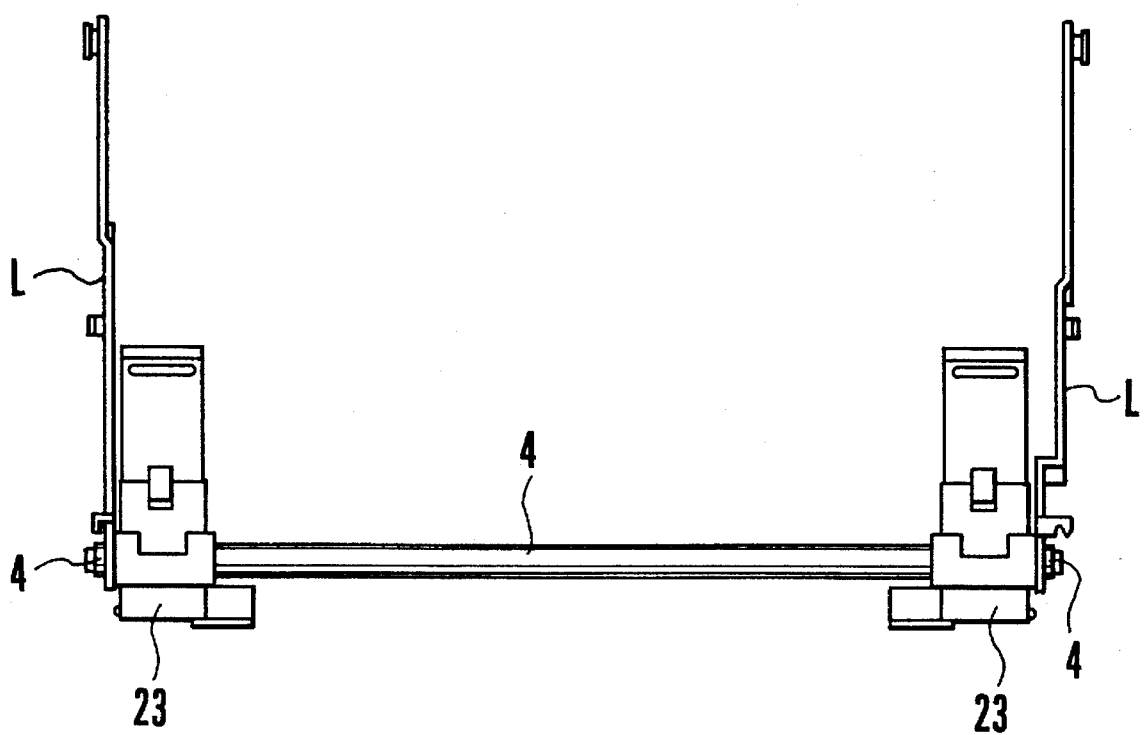
FIG. 12 is a plan view of a shaft holder.

Next, the holder and shaft holders of this embodiment are described with reference to FIGS. 11(a) to 11(c) and 12 as follows: FIGS. 11 (a), 11(b) and 11(c) show the structural arrangement of the holder 2, FIG. 11(a) showing it in a front view, FIG. 11(b) in a plan view and FIG. 11(c) in a side view. FIG. 12 shows in a plan view the shaft holders. The holder 2 is included in the cassette mounting device shown in FIGS. 6(a) to 6(c).

Referring to FIGS. 11(a) to 11(c) and 12, the shaft holders 23 are provided on the holder 2 which is arranged to hold the cassette 1. Shafts 4 are rotatably carried by the shaft holders 23. Links L which are connected to the holder 2 in such a way as to allow the holder 2 to move up and down are mounted on the shafts 4 on the two opposite sides of the holder 2. The shaft holders 23 are provided with screw holes 40. The holder 2 is provided with hooking bent parts 44. Hooks 45 which are provided on a cover 2c of the holder 2 engage the hooking bent parts 44. The cover 2c is securely screwed to the screw holes 40 with self-tapping screws.

Therefore, it is not necessary to have tapping machining on the body of the holder 2 which is a part to be formed by press working. The arrangement thus obviates the necessity of using a material which is strong against tapping, so that the weight of the device can be lowered and its manufacturing cost also can be reduced.

The holder 2 thus can be easily mounted and the manufacturing cost can be reduced by lowering the weight of the whole cassette mounting device.

Figure 13:
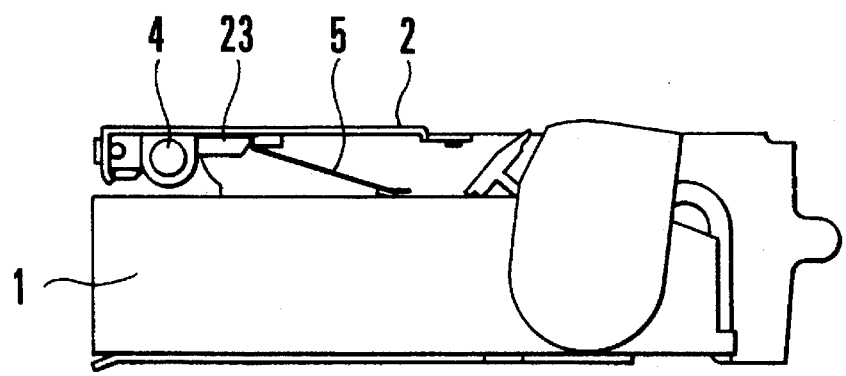
FIG. 13 is a sectional view taken along a line B—B of FIG. 6(a).
Figure 14:
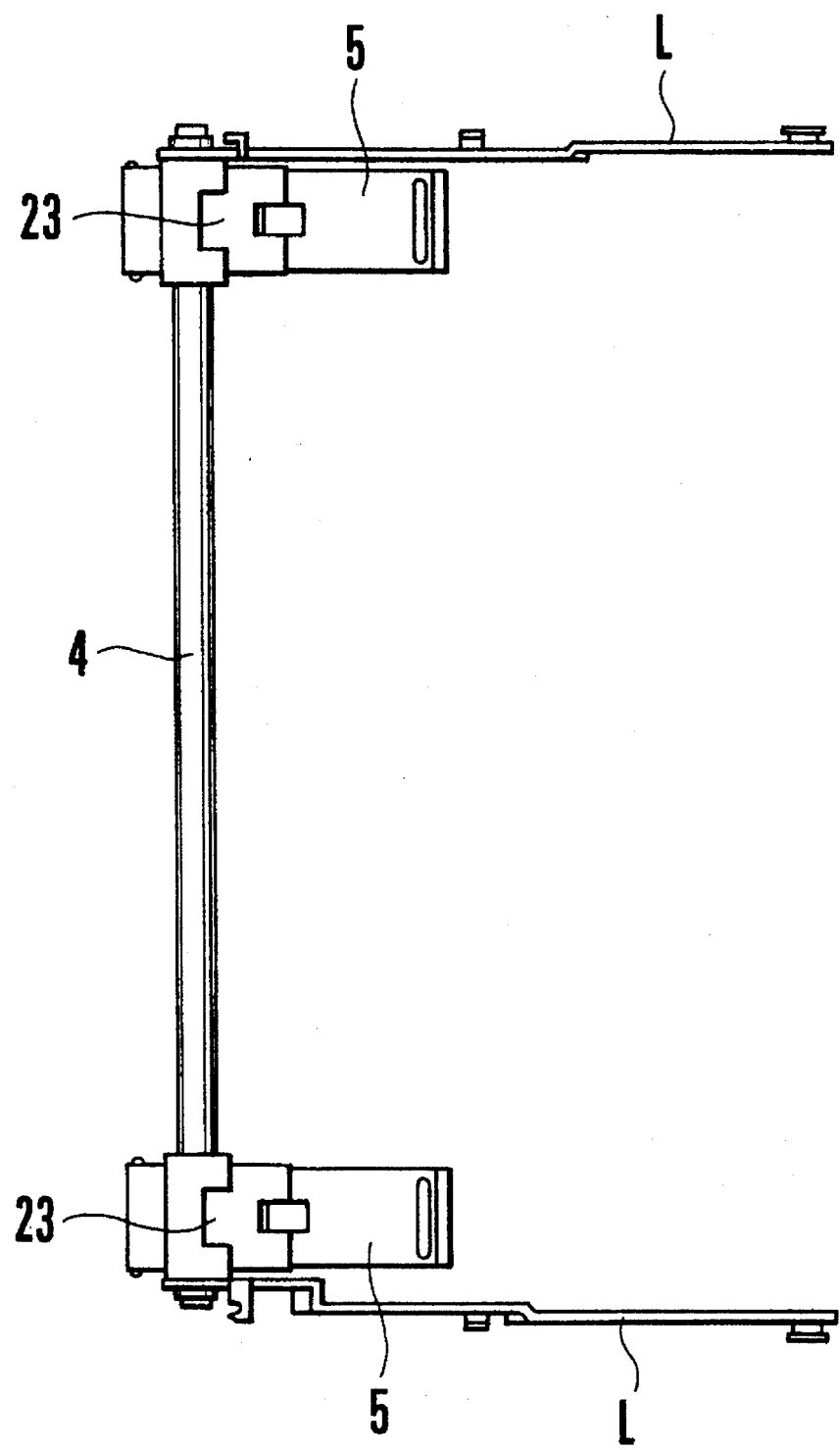
FIG. 14 is a plan view showing a shaft holder included in the embodiment of this invention.
Figure 15:
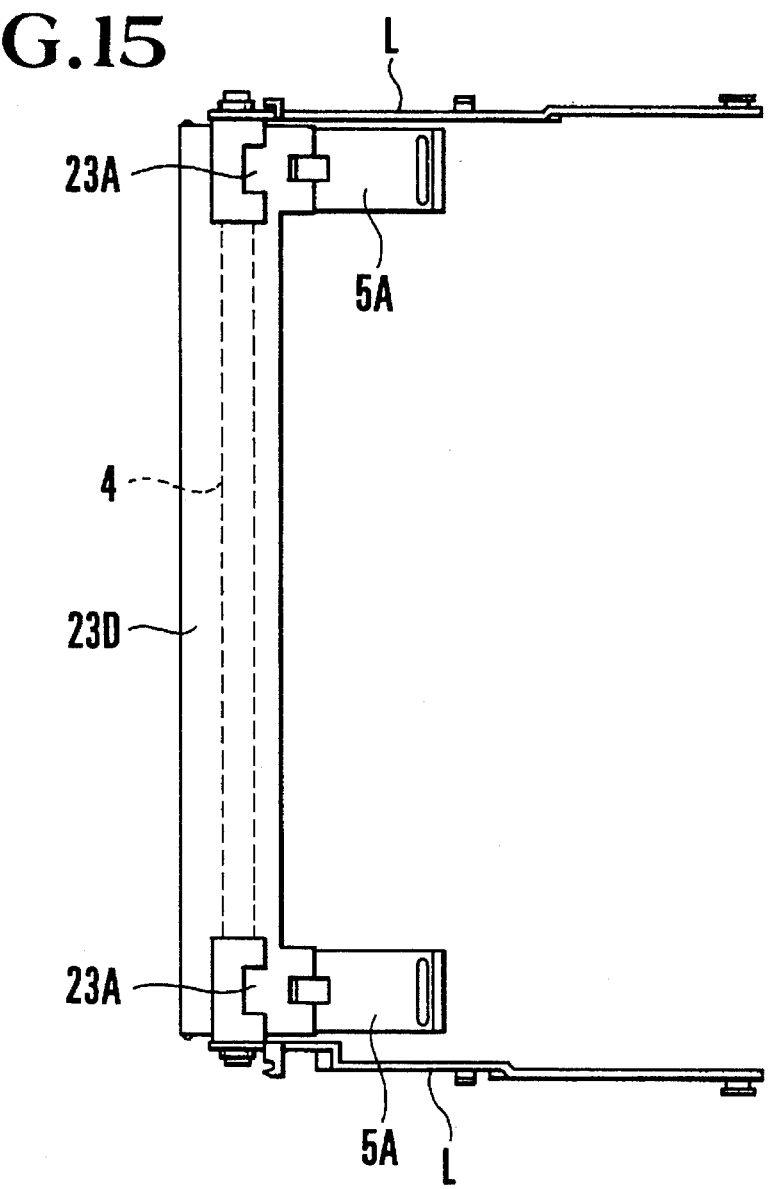
FIG. 15 is a plan view showing the arrangement of a modification of the shaft holder of the embodiment.
Figure 16:
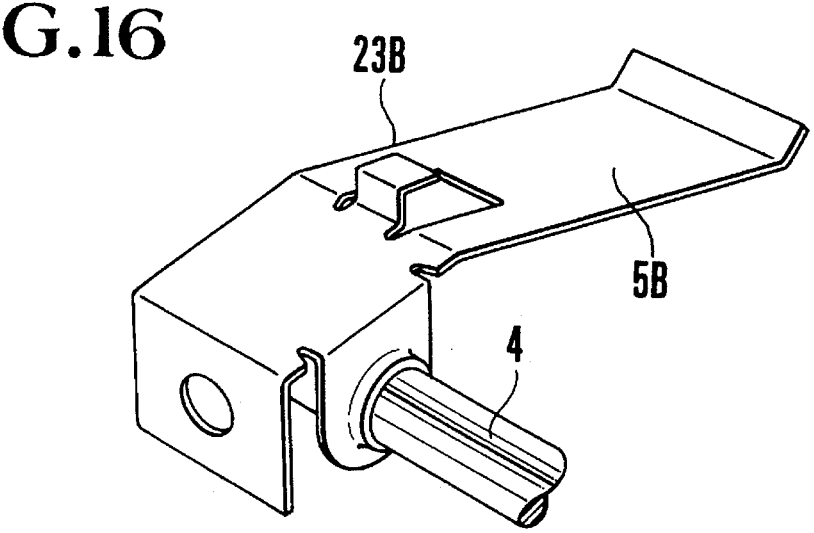
FIG. 16 is a plan view showing the arrangement of another modification of the shaft holder.

The shaft holders included in the embodiment are further described next with reference to the drawings. FIG. 13 is a sectional view taken on the line B—B of FIG. 6(a) and is similar to FIG. 8(b). FIGS. 14 is a plan view showing the shaft holders. FIGS. 15 and 16 are plan views respectively showing examples of modification of the shaft holders.

As shown in FIGS. 6(a), 13 and 14, cassette retaining springs 5 are formed integrally with the shaft holders 23 by a molding process called out-sert molding. The shaft 4 and the links L which connect the holder 2 in such a way as to allow the holder 2 to move up and down are carried by the shaft holders 23. Therefore, with the shaft holders 23 formed to a high degree of dimensional precision by the so-called out-sert molding, the distance of each of the cassette retaining springs 5 from a predetermined face of the holder 2 is precisely set at the time of assembly. The cassette 1 is thus stably pushed against the reel chassis 12 (FIG. 7(a)) by the cassette retaining springs 5.

FIG. 15 is a plan view showing a modification example of the shaft holders 23. In this case, the left and right shaft holders 23A are integrally connected by means of a connection part 23D. The shaft 4 and the links L are carried by the shaft holders 23A. According to the arrangement of this modification example, the interconnection of the shaft holders 23A further enhances the workability of assembly work. FIG. 16 is an oblique view showing another modification example of the shaft holder 23. In the case of that example, each of the shaft holders 23B is formed by a spring material, and a part of each of the shaft holders 23B is formed into a cassette retaining spring 5B. The arrangement of that modification example greatly reduces the manufacturing cost of the shaft holders 23B, so that the cost of the whole device can be lowered.

Since the shaft holders 23 and the cassette retaining springs 5 are integrally formed by the so-called out-sert molding, it is no longer necessary to perform caulking work in securing the cassette retaining springs 5 to the shaft holders 23 like in the case of the conventional device. The invented arrangement not only obviates the necessity of troublesome work in mounting the cassette retaining springs 5 but also allows the cassette retaining springs 5 to be precisely positioned, so that a cassette mounting device of high performance can be manufactured at a low cost.

What is claimed is:

1. A cassette mounting device comprising:
    a) a holder capable of moving, while holding a cassette in which a recording medium is contained, between a first position where the cassette can be inserted and ejected and a second position where information can be recorded or reproduced on or from the recording medium, said holder including
        a first member defining a first aperture part therein where the cassette can be inserted into and ejected from the holder in the first position and defining a second aperture part therein different from said first aperture part, a cassette inserted into said holder being removable from said holder through said second aperture part, and a second member removably secured to said first member and arranged to close said second aperture part when secured to said first member; and b) a moving mechanism arranged to move said holder between the first position and the second position.

2. A device according to claim 1, wherein said holder further includes a pressing member mounted on said second member to apply urging force to a cassette inserted into said holder.

3. A device according to claim 2, wherein said second member is formed by a resilient material, and wherein said pressing member is formed integrally with said second member.

4. A device according to claim 1, wherein said moving mechanism includes a pair of links which are arranged to allow the cassette inserted into said holder to be move toward a chassis.

5. A device according to claim 4, wherein said moving mechanism further includes a shaft which interconnects said pair of links, bearings for carrying said shaft, and pressing members provided at said bearings, said pressing members being arranged to push the cassette inserted into said holder.

6. A device according to claim 5, wherein said bearings are formed by a resilient material, and wherein each of said pressing members is formed integrally with one of said bearings.

7. An apparatus for recording or reproducing information on or from a recording medium contained in a cassette, comprising:

a) a rotary drum having a head arranged to record or reproduce information on or from the recording medium;

b) a cassette holder capable of moving, while holding a cassette in which a recording medium is contained, between a first position where the cassette can be inserted and ejected and a second position where information can be recorded or reproduced on or from the recording medium, said cassette holder including a first member defining a first aperture part therein where the cassette can be inserted into and ejected from the holder in the first position and defining a second aperture part therein different from said first aperture part, a cassette inserted into said cassette holder being removable from said holder through said second aperture part, and a second member removably secured to said first member and arranged to close said second aperture part when secured to said first member; and c) a moving mechanism arranged to move said holder between the first position and the second position.

8. An apparatus according to claim 7, further comprising a first chassis on which said rotary drum is mounted, and a second chassis on which said cassette holder is mounted, said second chassis being engaged with said first chassis in such a way as to relatively move said cassette holder toward and away from said rotary drum.

9. An apparatus according to claim 8, wherein said cassette holder further includes a pressing member mounted on said second member to push the cassette inserted into said cassette holder.

10. An apparatus according to claim 9, wherein said second member is formed by a resilient material, and wherein said pressing member is formed integrally with said second member.

11. An apparatus according to claim 8, wherein said moving mechanism includes a pair of links which are arranged to allow the cassette inserted into said cassette holder to be moved toward said chassis.

12. An apparatus according to claim 11, wherein said moving mechanism further includes a shaft which interconnects said pair of links, bearings for carrying said shaft, and pressing members provided at said bearings, said pressing members being arranged to push the cassette inserted into said cassette holder.

13. An apparatus according to claim 12, wherein said bearings are formed by a resilient material, and wherein each of said pressing members is formed integrally with one of said bearing.

* * * * *